United States Patent [19]
DeSanti et al.

[11] Patent Number: 4,647,150
[45] Date of Patent: Mar. 3, 1987

[54] MECHANICAL SPLICE FOR OPTICAL FIBERS

[75] Inventors: Raymond J. DeSanti, Worcester, Mass.; Girard T. St.Pierre, Endicott, N.Y.

[73] Assignee: ITT Corporation, New York, N.Y.

[21] Appl. No.: 687,606

[22] Filed: Dec. 31, 1984

[51] Int. Cl.⁴ .............................................. G02B 6/36
[52] U.S. Cl. ............................... 350/96.21; 350/96.20
[58] Field of Search ............... 350/96.15, 96.20, 96.21, 350/96.22

[56] References Cited

U.S. PATENT DOCUMENTS

| | | | |
|---|---|---|---|
| 3,919,037 | 11/1975 | Miller | 350/96.21 X |
| 4,047,796 | 9/1977 | Kao et al. | 350/96.21 |
| 4,057,448 | 11/1977 | Miller | 350/96.21 X |
| 4,506,946 | 3/1985 | Hodge | 350/96.21 |

FOREIGN PATENT DOCUMENTS

| | | | |
|---|---|---|---|
| 1174088 | 9/1984 | Canada | 350/96.2 |
| 2846951 | 4/1980 | Fed. Rep. of Germany | 350/96.21 |

OTHER PUBLICATIONS

Dalgleish, J. F. "Connections: Well-Designed Splices, Connectors Must Align Fibers Exactly", Electronics, Aug. 5, 1976, pp. 96-98.

*Primary Examiner*—William L. Sikes
*Assistant Examiner*—Akm E. Ullah
*Attorney, Agent, or Firm*—John T. O'Halloran; Mary C. Werner

[57] ABSTRACT

An arrangement for splicing two optical fibers together includes a tube into the respective ends of which each of the optical fibers is inserted. The tube has an eliptical cross-section. The tube is also curved and has an approximate 15° arch along its major axis. This construction results in self alignment of the fiber ends in both a vertical and a horizontal direction. A housing is either formed with the tube in a one piece unit or is subsequently positioned around the tube after the optical fiber ends are spliced. An optical adhesive material may be inserted into the tube and sleeve to prevent light transmission loss due to Fresnel reflections.

14 Claims, 5 Drawing Figures

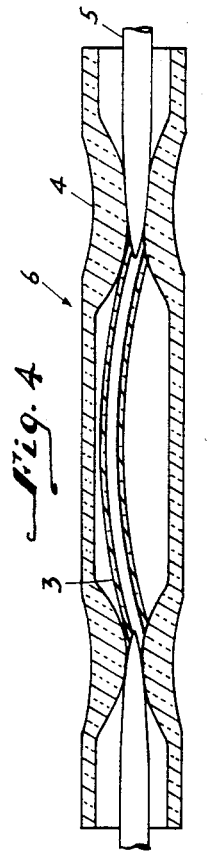
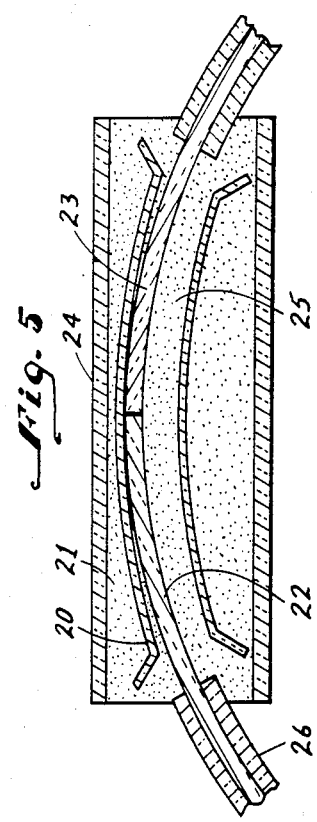
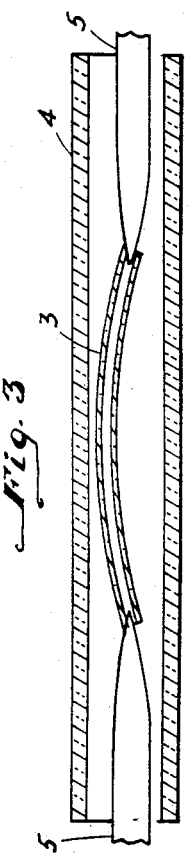
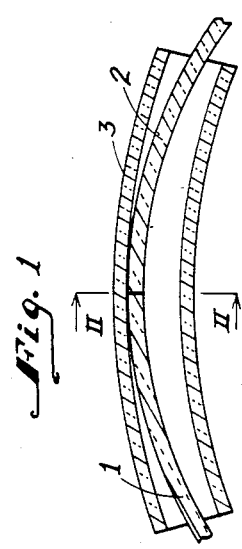
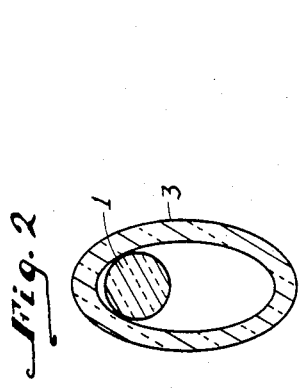

MECHANICAL SPLICE FOR OPTICAL FIBERS

BACKGROUND OF THE INVENTION

The present invention relates to optical glass fibers and more particularly to the splicing or joining of two separate optical fibers in such a way as to achieve maximum light transmission.

To achieve a good splice and minimize the loss of light at the joint, which is known as "insertion loss", the two optical fibers must be accurately aligned, the fiber ends must be in proper condition for splicing and there must be accurate control of the diameters of the fibers. The most difficult parameter to control is axial alignment since even quite small misalignments will result in appreciable insertion loss.

One method employed in performing optical fiber splicing is accomplished by applying an optical adhesive material to the fiber ends, clamping the ends together in fixed alignment and curing the adhesive. In another method, the optical fibers are aligned in an axial direction and are fused together at their ends by the application of heat to the joint area.

U.S Pat. No. 3,810,803 to P. H. Buhite et al discloses inserting a quantity of thermoplastic into an electrically conductive sleeve having flared ends. The fiber ends are then inserted into the sleeve, current is applied to the sleeve to cause the thermoplastic to become molten and then the sleeve is allowed to cool. Because heat must be applied to the sleeve after the insertion of the optical fibers into the sleeve, stress is introduced into the waveguiding structures which may result in reduced light transmitting capability and eventually failure of the optical fiber itself.

Lower insertion losses can be achieved by enclosing each of the fibers in a respective ferrule and then aligning the two ferrules by locating them in a closely fitting sleeve.

U.S. Pat. No. 3,870,395 to D. Schichetanz is directed to a capillary tube having a reduced central dimension which is slightly larger than the outer diameter of the fibers to be jointed. The tube is filled with a fluid and the ends of the tube provided with caps to retain the fluid.

Such reduced central dimension used with snug-fitting sleeves usually present problems. In order to provide alignment accuracy, the diameter of the central portion or entire sleeve must be only slightly larger than that of the fiber. Therefore, circular configuration and diameter tolerances of both fiber and sleeve must be strictly controlled. Also, with a snug-fitting sleeve fiber insertion of optical fibers therein is difficult.

In an article entitled "Loose Tube Splices for Optical Fibers" by C. M. Miller, appearing in *The Bell System Technical Journal*, September 1975, pp 1215-1225, a loose tube splice is used. In order to improve splicing, the optical fiber ends are biased to one corner of the square cross section of the tube by bending the fibers outside of the tube. The amount of bending of each fiber outside of the tube is critical since too much or too little bending of either fiber will cause transmission loss since the planar end faces of the fibers will not be accurately aligned in the tube. Furthermore, each end of the fiber must receive the same amount of bend so that one fiber end will not be offset by even a small amount so as to cause insertion loss. This is very difficult to achieve.

OBJECT OF THE PRESENT INVENTION

Accordingly, it is an object of the present invention to avoid the disadvantages of the prior art.

More particularly, it is an object of the present invention to provide an arrangement for splicing the ends of two optical fibers in a manner so as to achieve low insertion losses.

It is yet another object of the present invention to provide a splice apparatus which is fully self-aligning and eliminates the need for manual manipulation.

Another object of the present invention is to provide a splice arrangement which is simple in construction, inexpensive to manufacture and yet reliable in operation.

It is still a further object of the present invention to provide a method of forming such a splice arrangement.

SUMMARY OF THE INVENTION

In pursuance of these objects and others which will become apparent hereafter, one feature of the present invention resides in an arrangement for splicing optical fibers comprising an elliptical tube which is curved along its longitudinal axis and into which the ends of the optical fibers to be spliced are inserted.

Another feature of the invention resides in the provision of a housing which surrounds the tube and is designed to provide protection for the tube, lend strength to the splice area and permit easy insertion of the optical fiber ends therein.

An additional feature of this invention is the provision of a method of forming the splice tube and the housing.

BRIEF DESCRIPTION OF THE DRAWING

The above-mentioned and other features and objects of this invention will become more apparent by reference to the following description taken in conjunction with the accompanying drawing in which:

FIG. 1 is a longitudinal sectional view of the tube showing the optical fibers positioned therein;

FIG. 2 is a cross-sectional view of the tube of FIG. 1 taken along line II—II showing the eliptical configuration of the tube;

FIG. 3 is a longitudinal section of the tube and housing before application of heat to the end portions of the tube;

FIG. 4 is a view similar to FIG. 3 but after application of heat; and

FIG. 5 is a longitudinal sectional view of a modified tube and housing arrangement.

DETAILED DESCRIPTION OF THE PREFERRED EMBODIMENT

Referring to the drawings, and in particular to FIG. 1, optical fibers 1 and 2 which are to be spliced are inserted into ends of a capillary tube or sleeve 3. The tube 3 has an elliptical cross-sectional configuration as shown in FIG. 2. Although the elliptical configuration of the tube 3 is preferred, it is also possible to use a tube having a square configuration and still produce good splicing results. The tube 3 is also curved along its longitudinal axis in a plane which incorporates the plane of the major axis of the ellipse. For a tube having a square inner configuration the curve would extend along its longitudinal axis in a plane which incorporates a diagonal of the square.

Optical fibers have diameters in the range of 30 μm–600 μm. The splice arrangement of this invention may be used for any diameter optical fiber. It is only necessary that the minor axis of the internal surface of the elliptical tube 3 be greater than the diameter of the optical fibers to be coupled. The relationship between the diameter of the optical fibers and the tube 3 should be such that the optical fiber will contact the inner surface of the outer arced wall of the tube 3 at two points on the surface of the optical fiber. The range for the inner minor diameter of the tube 3 is 145–180 μm. The 145 μm dimension is preferred for the 125 μm diameter fiber. The inner major diameter of the tube 3 is in the range of 600–1000 μm, with the 600 μm dimension being preferred for the 125 μm diameter fiber.

However, the arrangement described herein is for optical fibers formed from a preform comprising a central glass core and an outer glass cladding layer and have a diameter of approximately 125 μm. After drawing of the optical fibers from the preform, a plastic coating is applied to the outer surface of the fiber to protect the fiber from marring or scratching during further processing bring the outer diameter of the fiber to 250 μm. The splice arrangement of this invention may also be used with plastic clad optical fibers where the core is glass and the cladding is a plastic material.

In order to provide a sleeve which is large enough to accommodate the optical fibers but yet is so designed as to allow only one positioning of the optical fibers ends therein to provide accurate alignment upon insertion without further manipulation, it has been found that by bending the sleeve along its longitudinal axis to form an arcuate configuration, such requirements are met. Since optical fibers are strong and have a certain degree of flexibility, they may be inserted into such sleeve and easily slid along the arcuate interior thereof without breaking or coiling. The arcuate course of the tube 3 brings about gradual bending of the optical fibers 1 and 2 within the tube 3 so that the fibers 1 and 2 are brought into perfect alignment with one another.

Such a sleeve configuration is formed in the following manner. The tube 3 is drawn from a high purity clear fused quartz silica glass preform. Any other glass may be used as long as the index of refraction of the glass is below that of the optical fibers to be joined. The preform is rectangular in shape and the drawing thereof results in surface tension in the molten glass which causes the rectangular cross-section of the preform to collapse into an ellipse. In a like manner, any suitable means for producing such elliptical or rectangular design, in addition to fiber drawing, may be used.

The elliptical tube 3 is then bent to form an arc with a radius of 10–20 inches and an angle of approximately 15°–21° The preferred narrow range is 14–16 inches. For the smaller radius of curvature the angle is increased to 21° As can be seen, when using the larger angle of 21°, there should be a corresponding tighter tolerance with respect to the range of the inner major and minor diameters in order to maintain the desired path of travel of the optical fiber ends along the inside of the tube 3. This arced configuration is accomplished by bending the elliptical tube 3 along its longitudinal axis on a mandrel which has the desired arc radius. The ends of the tube 3 are held in position by retaining pins. The tube is then heated with a hydrogen-oxygen flame to the softening temperature of the glass. When t,he tube 3 has reached the optimum arc, it is removed from the mandrel and cut to a desired length. The optimum length of the arc is in the range 1.125–1.375 inches although a length in the range of 0.875–1.625 inches would produce acceptable results.

The tube 3 may be used at this point to provide an optimum optical fiber splice. It may be desirable, however, to provide a housing 4 for the tube 3 which will support the tube and give strength to the splice area. Also, since it is difficult to insert the ends of the optical fibers 1 and 2 into the small apertures of the tube 3 and to perform such insertion without damaging the fiber, it is desirable to form a housing 4 which surround the tube 3 and which has funnel shaped end portions to permit easier insertion of such optical fiber ends. The housing 4 extends beyond the ends of the tube 3 and is joined to each of the ends of the tube 3. A one-piece splice unit 6 is thus formed.

The housing 4 is constructed from round capillary tubing. Standard 1 mm inner diameter tube with a 0.5 mm wall thickness and a melting temperature of approximately 820° C. may be used, although any suitable glass having a melting temperature below that of the tube 3 may be used.

The housing 4 is formed in the following manner. Referring to FIGS. 3 and 4, the ends of the arced tube 3 are positioned between two tapered mandrels 5. A tube having an inner diameter large enough to accommodate the arced tube 3 is positioned to surround the tube 3 and the mandrels 5. The housing 4 is then heated to a temperature at which the housing tube 4 will soften but the inner tube 3 will remain firm. Such heating is directed at the portions of the housing 4 where the ends of the tube 3 join the mandrels 5. Thus at its end the outer glass tube 4 flows around the mandrels 5, creating a funnel-shaped structure at each end of the housing 4 while at the same time securing the elliptical tube 3 to the housing 4. In this manner, a one-piece splice unit 6 is formed which also permits easier insertion of the, ends of the optical fibers 1 and 2 which are to be joined.

No further heat processing is used in the formation of the splice unit 6 or in its use in the splicing operation.

Following formation of the unit 6, the tube 3 is filled with an optical adhesive. By using the adhesive, Fresnel losses are reduced and the fiber ends can be inserted more easily into the tube 3. The cured adhesive holds the fiber ends in position. The adhesive used in this embodiment is an ultra-violet light curable material, although any other adhesive composition which reduces light reflection may be used.

A factor in achieving an optimum splice is the condition of the optical fiber ends. It is important that the ends of the optical fibers 1 and 2 have square cleaves. It is preferred that a cleaving tool be used to obtain the square cleave since a hand scribe may produce an angular cleave which will result in misalignment of the fiber ends in the tube 3.

Before insertion of the ends of the optical fibers 1 and 2 into the housing 4, the plastic protective coating 8 is stripped back from the ends of the fibers to be jointed to the area of the flared portions of the unit 6 as measured when the fibers are in their fully inserted position therein. The diameter of the optical fibers 1 and 2 without the protective coating is approximately 125 um. When using the plastic clad glass core optical fibers, the plastic cladding is stripped back to the area of the flared portion of the unit 6. In this situation, it is necessary that the optical adhesive be positioned so that it will surround all areas of the unclad fiber and be of a material having an index of refraction which will prevent light from escaping from the core.

One end of either optical fiber 1 or 2 is inserted into one end of the unit 6 and is slid into the unit 6 to approximately the mid-point thereof. The end of the other of the two fibers 1 and 2 is then inserted into the opposite end of the unit 6 and is slid into the unit 6 until it abuts the end of the previously inserted fiber. The ends are aligned automatically due to the elliptical curved configuration of the tube 3 without any further manual manipulation being required. The horizontal alignment of the fiber ends in the tube 3 is achieved by the elliptical shape of the inner wall 7 of the tube 3. The wall 7 acts as a guide and does not permit movement of tne ends of the fibers 1 and 2 in a horizontal direction.

Because the tube 3 has an arcuate configuration, the optical fibers 1 and 2 are also automatically vertically aligned. Thus, no manual manipulation of the fibers 1 and 2 is necessary to align the fibers in either a vertical or a horizontal direction The length of the sleeve 3 and the degree of arc is such that the fibers 1 and 2 are positioned against the section of the inner wall 7 which forms the outwardly directed portion of the arced tube and continue along that wall for a considerable portion of their lengths. Thus, the angles of the light wave propagating through the splice area remain the critical angle to insure the greatest amount of internal reflection and the least amount of insertion loss.

Once the fibers 1 and 2 are positioned in the center of the tube 3, the unit 6 is exposed to ultra violet light in order to cure the optical adhesive which at the same time, seals the protective coating which has been stripped back to this point to the unit 6 at the flared ends thereof. In this manner, a permanent connection and a well supported splice is formed.

As shown in FIG. 5, there is provided a tube 20 having the same elliptical and arcuate configurations discussed above but with flared ends. The tube 20 is filled with an optical adhesive 21 and has optical fibers 22 and 23 with at least one protective coating 26 stripped back to the area of the flared ends positioned therein in abutting relationship. A glass sleeve 24 is positioned around the tube 20 and extends beyond the ends of the flared ends of the tube 20. The sleeve 24 is also filled with an optical adhesive 25.

This modified form of the mechanical splice arrangement is formed as follows. The sleeve 24 is positioned onto one end of either optical fiber 22 or 23 beyond the intended splice area. The tube 20 is filled with an ultra violet light curable optical adhesive. One end of the optical fiber 22 is inserted into the end of the tube 20 and is guided along the inner wall of the tube 20 to an approximate position midway therein. An end of an optical fiber 23 is then inserted into the opposite end of the tube 20 and is guided along the inner wall of the tube 20 by its elliptical configuration until it abuts the already positioned optical fiber 22.

Once the ends of the fibers 22 and 23 are aligned, the optical adhesive is cured with an ultra violet light source. After curing of the adhesive 21, the glass sleeve 24 is moved into position around the tube 20. The sleeve 24 is then filled with an ultra violet light curable optical adhesive which is subsequently cured.

Although this construction involves two separate tube pieces which will take slightly longer to assemble than the one piece unit discussed above, this construction is relatively inexpensive and. It provides a strong splice area. In this embodiment, it is also important that the ends of the optical fibers 20 and 21 be prepared with square cleaves to prevent any misalignment which would result in insertion loss.

Whether the one-piece or two-piece construction is used, the mechanical splice of this invention eliminates the need for purchasing more expensive fusion splice equipment.

While we have described above the principles of our invention in connection with specific apparatus, it is to be clearly understood that this description is made only by way of example and not as a limitation to the scope of our invention as set forth in the objects thereof and in the accompanying claims.

We claim:

1. An arrangement for joining optical fibers at their ends comprising:
    a glass tube which has an inner ellipitcal cross-section, a substantially constant inside diameter and a curved configuration along its longitudinal axis in a plane including the plane of the major axis of the eliptical cross-section, said elliptical cross section being greater than the cross section of the optical fibers to facilitate insertion of the optical fibers into said tube, said curved configuration permitting positioning of one end of each of the optical fibers in self aligning abutting relationship approximately midway in said tube.

2. The arrangement as claimed in claim 1 wherein the curved configuration includes an angle of arc in the range of approximately 15°–21°.

3. The arrangement as claimed in claim 1 wherein the tube has a length in the range of 1.125–1.375 inches and a respective arch radius of 15–16 inches.

4. The arrangement as claimed in claim 2 wherein the tube has a length in the range of 0.875–1.625 inches and a respective arc radius of 10–20 inches.

5. The arrangement as claimed in claim 1 further comprising a glass housing surrounding the tube and joined thereto, said housing having funnel shaped end sections to facilitate insertion of the optical fiber ends.

6. The arrangement as claimed in claim 1 further comprising an optical adhesive located in the tube.

7. The arrangement as claimed in claim 6 wherein the adhesive is an ultra violet light curable adhesive.

8. A method of forming a splice arrangement for optical fibers comprising the steps of:
    forming a tube having an inner elliptical cross section and a substantially constant inside diameter;
    bending the tube along its longitudinal axis in the plane of the major axis of the elipse to form an arcuate configuration;
    inserting one end of one optical fiber into the first tube approximately mid-way therein; and
    putting one end of the second optical fiber into the opposite of the tube to abut the first end in self-aligning relationship.

9. The method aa claimed in claim 8 further comprising:
    positioning a glass housing around the tube;
    providing funnel shaped ends in the housing; and
    joining the tube and the housing to form a single unit.

10. The method as claimed in claim 9 wherein said positioning step includes selecting a glass housing which has a softening temperature below that of the tube.

11. The method as claimed in claim 10 further comprising before said providing step, a step of heating the housing to its softening temperature.

12. The method as claimed in claim 9 further comprising after said joining step, filling the tube with an optical adhesive.

13. A method of joining one end of each of two optical fibers comprising the steps of:
- forming a first glass tube with an elliptical inside configuration and a curved configuration along its longitudinal axis in a plane which incorporates the plane of the major axis of the ellipse;
- filling the first tube with an optical adhesive;
- inserting one end of one optical fiber into the first tube approximately mid-way therein;
- putting one end of the second optical fiber into the opposite of the tube to abut the first end in self-aligning relationship;
- curing the optical adhesive;
- positioning a second glass tube with a spacing therebetween to surround the first tube;
- introducing a predetermined quantity of an optical adhesive into the spacing; and
- curing the adhesive in the second tube.

14. The method as claimed in claim 13 wherein each of said filling steps includes selecting an optical adhesive which is ultra violet curable.

* * * * *